US006629595B2

United States Patent
Wiese et al.

(10) Patent No.: US 6,629,595 B2
(45) Date of Patent: Oct. 7, 2003

(54) CONVEYOR SYSTEM (75) Inventors: Ronald J. Wiese, Crystal Lake, IL (US); Craig A. Elliott, DeKalb, IL (US)

(73) Assignee: Amsted Industries Incorporated, Chicago, IL (US)

( * ) Notice: Subject to any disclaimer, the term of this patent is extended or adjusted under 35 U.S.C. 154(b) by 0 days.

(21) Appl. No.: 10/072,187

(22) Filed: Feb. 5, 2002

(65) Prior Publication Data

US 2003/0146071 A1 Aug. 7, 2003

(51) Int. Cl.[7] .............................................. B65G 15/10
(52) U.S. Cl. ....................... 198/817; 198/602; 198/567; 198/459.8
(58) Field of Search ................................ 198/817, 602, 198/605, 606, 567, 570, 459.8, 461.3

(56) References Cited

U.S. PATENT DOCUMENTS

| | | | | |
|---|---|---|---|---|
| 1,206,305 A | * | 11/1916 | Cowley | 198/817 |
| 2,280,136 A | * | 4/1942 | Webster et al. | 156/582 |
| 3,464,537 A | * | 9/1969 | Thull | 198/369.7 |
| 4,146,124 A | * | 3/1979 | Krooss | 198/456 |
| 4,733,768 A | * | 3/1988 | Aquino et al. | 383/22 |
| 5,576,520 A | * | 11/1996 | Waterman et al. | 177/145 |

* cited by examiner

Primary Examiner—Christopher P. Ellis
Assistant Examiner—Richard Ridley
(74) Attorney, Agent, or Firm—Edward J. Brosius (57) ABSTRACT A conveyor system includes a first conveyor, a second conveyor and a transfer mechanism interposed between the first and second conveyors. The first conveyor has an input end, an output end, and a pair of laterally spaced belts rotating between its input and output ends. The belts define an upper drive run which travels in a direction from the input end towards the output end. The second conveyor has an input end adjacent the output end of the first conveyor and a distally spaced output end. The second conveyor includes a pair of laterally spaced belts rotating between its input and output ends. The belts define an upper drive run which travels in a direction from the input end towards the output end. The transfer mechanism includes first transfer pulley positioned inwardly of the output end of the first conveyor and a second transfer pulley positioned inwardly of the output end of the second conveyor. A transfer belt rotates between the first and second transfer pulleys and defines an upper transfer run that travels longitudinally between the output end of the first conveyor and the input end of the second conveyor for transferring objects therebetween. Separate motors are provided for the first and second conveyors so that the conveyors can be operated at different speeds. A mechanism is provided for driving the transfer belt at the same speed as the belts on the second conveyor.

18 Claims, 9 Drawing Sheets

FIG.12

CONVEYOR SYSTEM

RELATED APPLICATIONS

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

Conveyors are commonly used in manufacturing facilities for routing material such as parts and components between work stations. In some applications two or more conveyors are aligned end-to-end for routing parts across relatively long distances, for example. In such applications, it known to interpose a plate or other support member between the output end of an upstream conveyor and the input end of an adjacent, downstream conveyor for transferring components between the conveyors. In operation, components are discharged from the output end of the upstream conveyor and onto the transfer plate. Depending on the length of the component, the component may remain on the transfer plate until it is impacted by another component that is subsequently discharged from the upstream conveyor. In theory, the subsequently discharged components will push the other component off of the transfer plate and onto the input end of the downstream conveyor. Such a design suffers from several drawbacks. For example, the impact between components on the transfer plate can damage the components. This is particularly problematic when the conveyors are used for transferring precision components, such as certain machined parts for automobile engines. Moreover, relatively heavy components can become stuck on the transfer plate, which may necessitate shutting down the line.

BRIEF SUMMARY OF THE INVENTION

A conveyor system according to certain aspects of a specific embodiment of the present invention includes a first conveyor, a second conveyor and a transfer mechanism. The first conveyor has an input end, an output end, and a pair of laterally spaced belts rotating between its input and output ends. The belts define an upper drive run which travels in a direction from the input end towards the output end. The second conveyor has an input end adjacent the output end of the first conveyor and a distally spaced output end. The second conveyor includes a pair of laterally spaced belts rotating between its input and output ends. The belts define an upper drive run which travels in a direction from the input end towards the output end. The transfer mechanism includes first transfer pulley positioned inward of the output end of the first conveyor and a second transfer pulley positioned inwardly of the output end of the second conveyor. A transfer belt rotates between the first and second transfer pulleys and defines an upper transfer run that extends longitudinally between the output end of the first conveyor and the input end of the second conveyor for moving material between the first and second conveyors. The conveyor belts and/or the transfer belts may be round in cross-section, or may assume other configurations, such as flat belts or U-shaped belts.

Separate motors may be provided for the first and second conveyors so that the conveyors can be operated at different speeds. The conveyor system may include a means for rotating the transfer belt at the same speed as the belts of one of the first and second conveyor. The means may include a gear assembly interconnecting one of the transfer pulleys for rotation at the same speed as one of the first and second conveyors. Alternatively, the transfer mechanism may be driven by its own motor.

The transfer mechanism may include a third transfer pulley interposed along the return run of the transfer belt for routing the return run around the input pulley of the second conveyor and the output pulley of the first conveyor.

The foregoing summary, as well as the following detailed description of the preferred embodiments of the present invention, will be better understood when read in conjunction with the appended drawings. For the purpose of illustrating the preferred embodiments of the present invention, there is shown in the drawings, embodiments which are presently preferred. It should be understood, however, that the present invention is not limited to the arrangements and instrumentality shown in the attached drawings.

DETAILED DESCRIPTION OF THE INVENTION

Referring to the drawings, a conveyor system 10 in accordance with certain aspects of a specific embodiment of the present invention includes a first conveyor 12a, a second conveyor 12b and a transfer mechanism 16 for moving material between the first and second conveyors. In the illustrated embodiment, the conveyor system 10 is used to convey cylindrical pins 17. However, it will be appreciated that the conveyor system can readily be sized and configured for use with a variety of other goods. The first and second conveyors 12a, 12b have a generally identical construction. Each conveyor 12a, 12b has an input end 18a, 18b carrying an input pulley 20a, 20b and an output end 22a, 22b carrying an output pulley 24a, 24b. Each conveyor includes a frame 26a, 26b having a front rail 28a, 28b and a back rail 30a, 30b. The front rails 28a, 28b and back rails 30a, 30b extend along the length of a respective conveyor 12a, 12b for supporting the pulleys and other conveyor components. Each conveyor 12a, 12b includes a pair of laterally spaced belts 32a, 34a, 32b, 34b connected for rotation around their respective input and output pulleys. The belts 32a, 34a; 32b, 34b present upper drive runs 36a, 36b for transporting components from the input end 18a, 18b of the conveyor 12a, 12b towards the output end 20a, 20b of the conveyor 12a, 12b.

Figure 1:
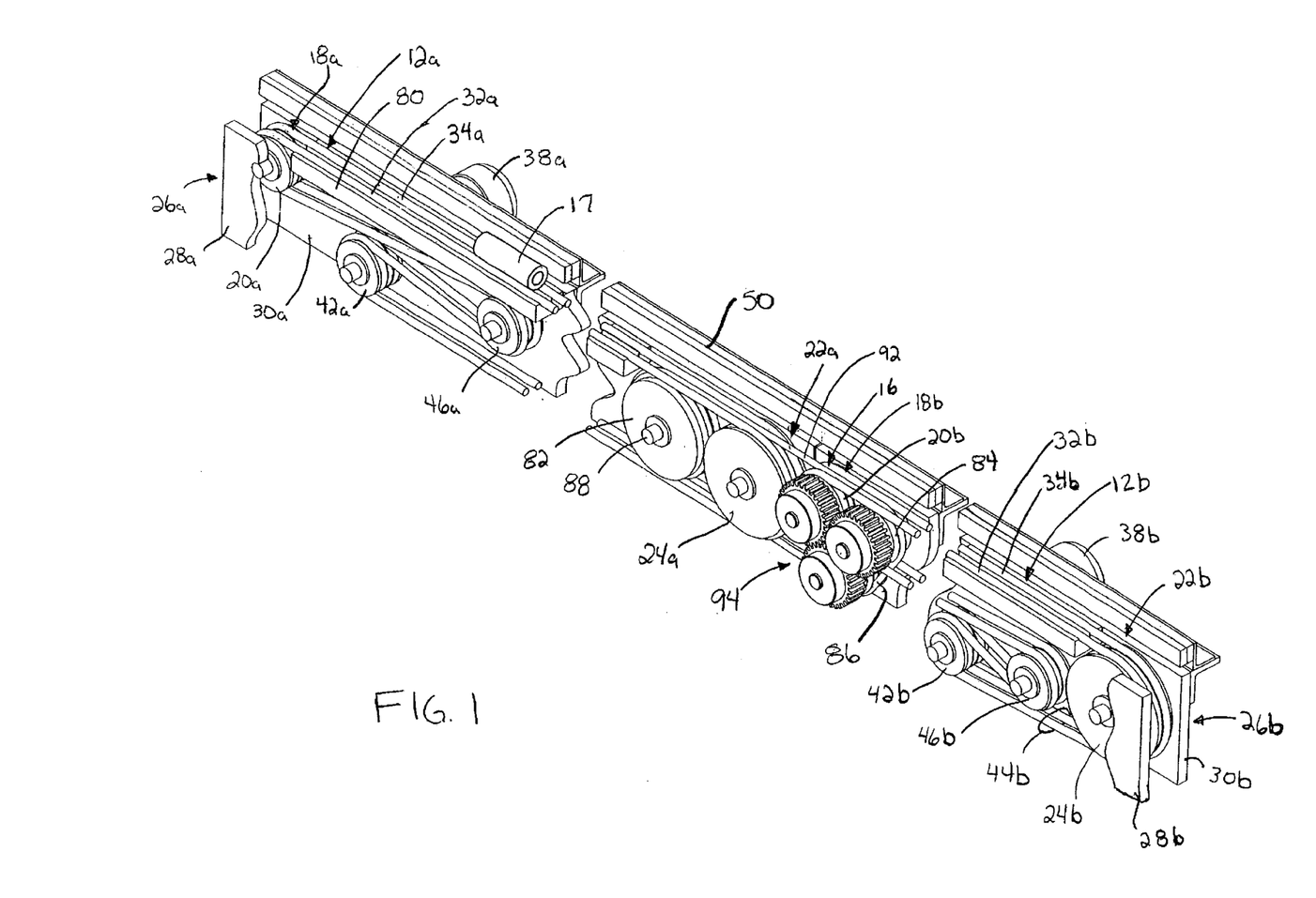
FIG. 1 is a perspective view of a conveyor system illustrating certain aspects of a specific embodiment of the present invention.
Figure 2:
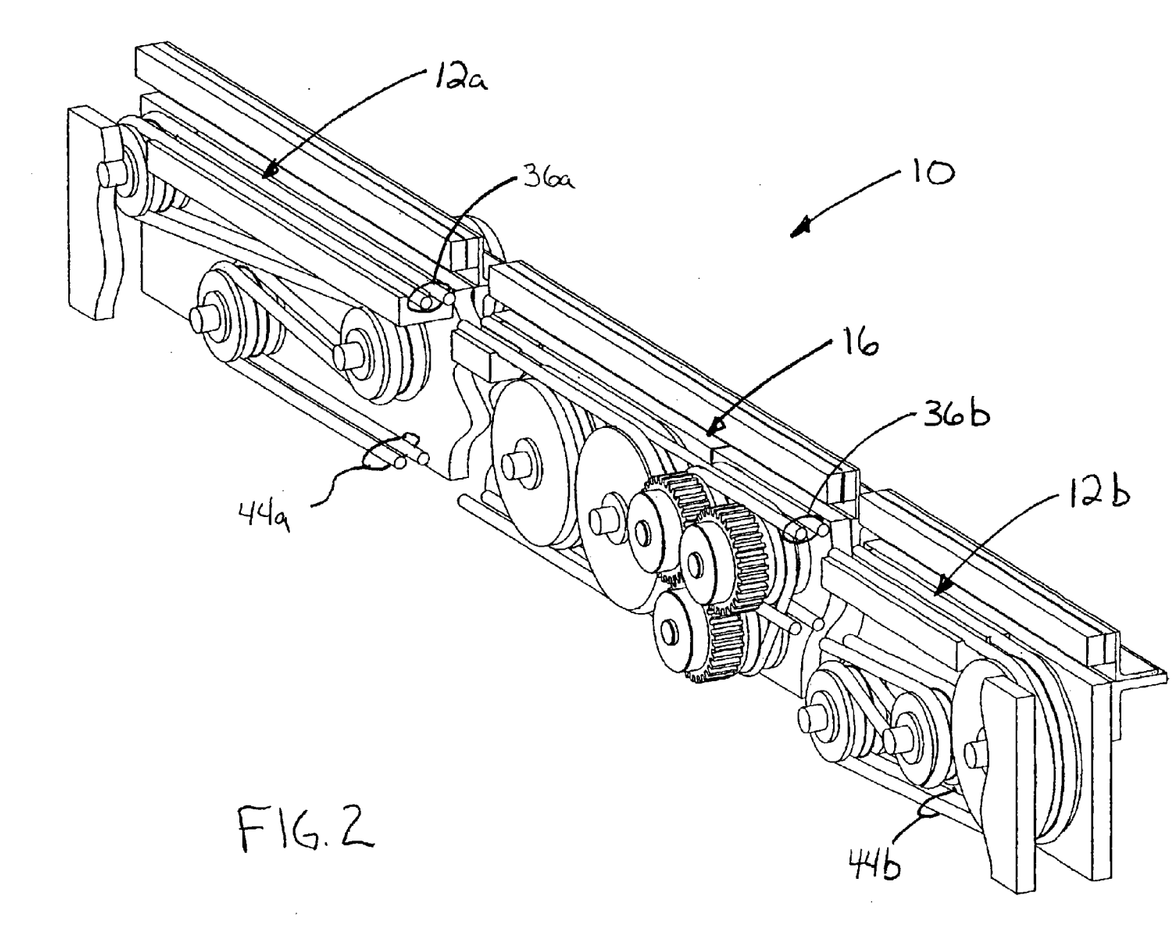
FIG. 2 is another top front perspective view of the conveyor system of FIG. 1
Figure 3:
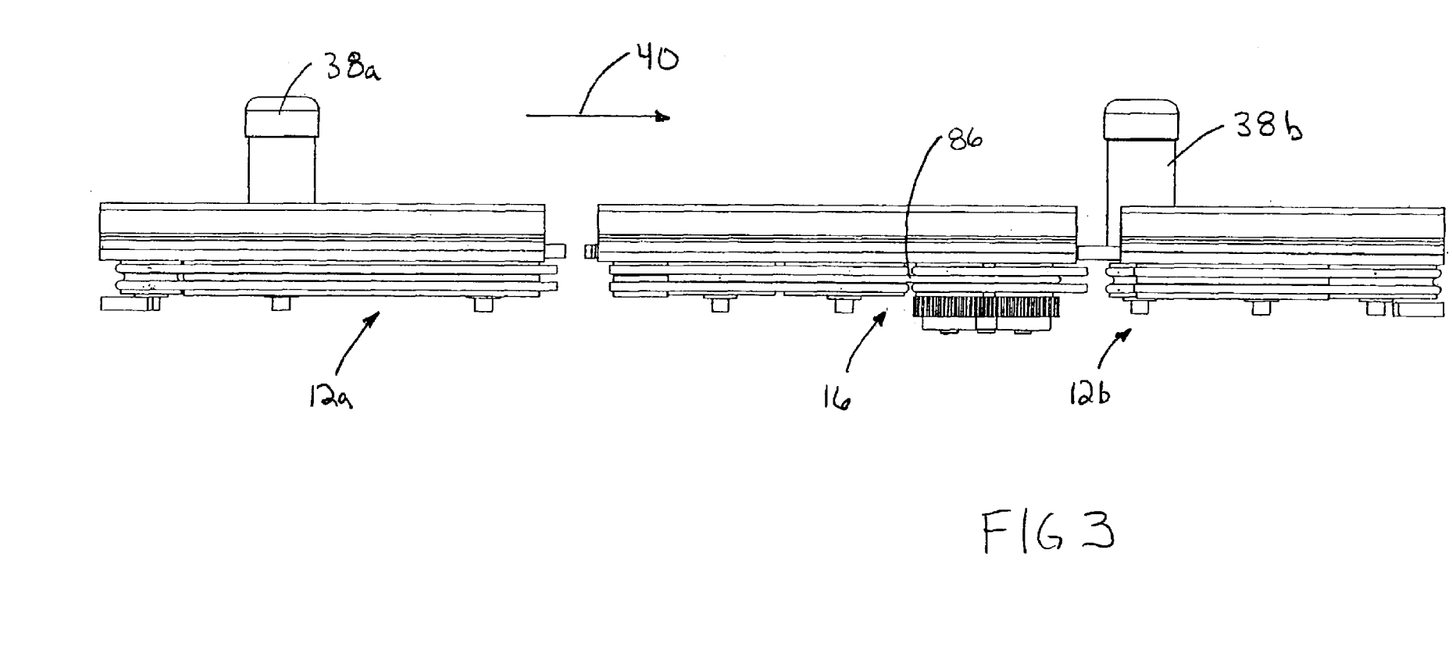
FIG. 3 is a top view of the conveyor system of FIG. 1.

Each conveyor 12a, 12b includes a motor 38a, 38b connected for driving the belts 32a, 32b, 34a, 34b so that the upper drive run 36a, 38b travels in a direction 40 (see FIG. 3) from the input end 18a, 18b towards the output end 22a, 22b. Separate motors 38a, 38b are provided for each conveyor 12a, 12b so that the speeds of the conveyors can be varied relative to one another. In the illustrated embodiment, each motor 38a, 38b is coupled to a respective drive pulley 42a, 42b. The drive pulley 42a, 42b is interposed along the return run 44a, 44b of the conveyor belts 32a, 32b, 34a, 34b. It will be appreciated, however, that the motor 38a, 38b could alternatively be directly coupled to either the input pulley 20a, 20b or the output pulley 24a, 24b of a respective conveyor 12a, 12b. A tensioning pulley 46a, 46b is interposed along the return run 46a, 46b, between the drive pulley 42a, 42b and the input pulley 20a, 20b of a respective conveyor 12a, 12b. The tensioning pulleys 46a, 46b can be moved longitudinally along a respective frame 26a, 26b to adjust belt tension, as is common in the art.

Figure 11:
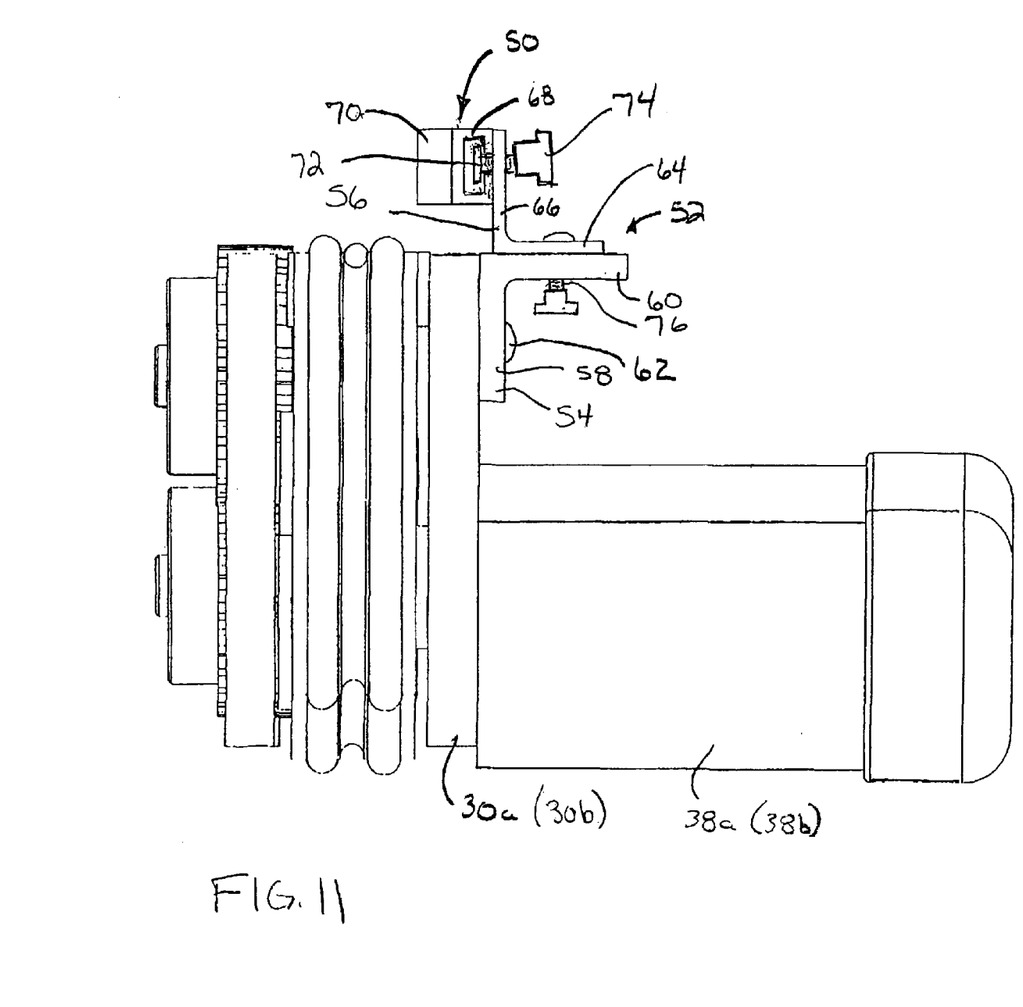
FIG. 11 is an end view of the conveyor system of FIG. 1.

Support rails 50 may be provided along the front and back sides of the upper drive runs 36a, 36b for preventing components from falling off of the conveyors 12a, 12b. The front and back support rails have an identical construction, so, for clarity purposes, only the back support rails have been illustrated in the drawings. Separate support rails 50 may be provided for each of the conveyors. Alternatively, as is shown, one continuous support rail may extend along the length of both conveyors. As can be seen in FIG. 11, the support rails 50 are secured to the frames 26a, 26b by mounting brackets 52. The mounting brackets may extend along the entire length of a given support rail 50, or a plurality of smaller brackets may be spaced along the length of the support rail. Each mounting bracket 52 includes first and second angle brackets 54, 56. The first bracket 54 has a vertical leg 58 connected to the rail 30a, 30b of the frame 26a, 26b and a horizontal leg 60 that extends outwardly from the upper end of the vertical leg 58. The first bracket 54 may be connected in a height adjustable manner to the rail 30a, 30b. For this purpose, the first bracket 54 can have a vertical slot. A bolt 62 extends through the slot and threads into a reciprocal aperture in the frame rail 30a, 30b. The bolt 62 can be threaded inwardly into the frame's rail 30a, 30b to clamp the vertical leg 58 against the rail 30a, 30b. The bolt 62 can be loosened so that the slot can be slid along the bolt 62 to adjust the height of the first bracket 54 relative to the frame's rail 30a, 30b. It will be appreciated that a variety of other means can be used to mount the bracket 54 to the side rail. For example, the frame rail 30a, 30b could include a horizontally extending bolt configured to slidably mate with the vertical slot in the leg 58. A nut or clamp down handle would thread onto the distal end of the bolt to clamp the vertical leg 58 against the rail 30a, 30b of the frame.

The second angle bracket 56 includes a horizontal leg 64 that rests on the horizontal leg 60 of the first bracket 54. The second bracket 56 also has a vertical leg 66 that extends upwardly from the inner edge of its horizontal leg 64. The support rail 50 is secured to the inner face of the vertical leg 66. The support rail 50 includes a first, outer member 68 formed from metal, e.g., aluminum, and a second, inner member 70 formed from a relatively soft material, such as a polymer. Forming the first member 68 from metal increases the structural integrity of the support rail 50, while forming the second member 70 of a soft material reduces the likelihood that components carried on the conveyor will be damaged if they impact against the support rail 50. The support rail 50 may be connected to the second bracket 56 in a height adjustable manner, as was described above. For example, the vertical leg 66 of the second bracket 56 can include a vertical slot (not shown) configured to slidably mount on a bolt 72 that extends from the support rail 50. A handle or nut 74 threads onto the distal end of the bolt 72 and can be tightened down to fix the height of the support rail 50 relative to the second bracket 56.

Similarly, the second bracket 56 can be connected to the first bracket 54 in a manner such that it can be moved laterally inwardly and outwardly relative to the conveyor belts. For example, one or both of the brackets 54, 56 can have laterally extending slots (not shown) formed in the horizontal leg(s) 60, 64. Fasteners 76 pass through the slots and can be tightened to clamp the brackets together and loosened to allow the second bracket to slide laterally on the first bracket.

Figures 9, 10:
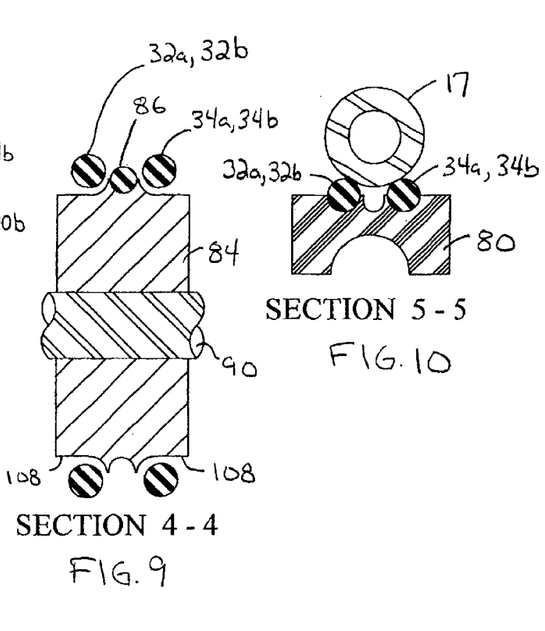
FIG. 9 is a cross-sectional view along line 4—4 of FIG. 4B.
FIG. 10 is a cross-sectional view along line 5—5 of FIG. 4B.

In the illustrated embodiment, the belts 32, 34 are round in cross section. Suitable round belts are round polyurethane belting as is commercially available from Fenner Drives of Manheim, Pa. It will be appreciated, however, that belts of other shapes including flat belts or V belts, and/or materials can be used without departing from the scope of the present invention. Round belts are particularly well-suited for components that are round in cross-sections, such as the pins 17. Using round belts increases the surface contact between the cylindrical pins 17 and the conveyor belts 32a, 32b, 34a, 34b. Additionally, as can be seen in FIG. 10, when the pins 17 are placed lengthwise on the belts, the pin 17 seats in the gap between the belts 32a, 34a; 32b, 34b. As a result, it is possible to eliminate the side support rails 50 along portions of the conveyors 12a, 12b. In certain applications, the support rails should generally be provided at least along the transfer mechanism 16, particularly in the region where the transfer belt 86 is the only belt engaging the components, e.g., the pins 17. The ability to eliminate the support rails 50 is advantageous, for example, because it allows cameras to be placed along sides of the conveyor for use in quality assurance and other inspection processes. By contrast, if flat belts were used to transfer such components, side support rails would be required for retaining the components on the belts.

Figures 7, 8:
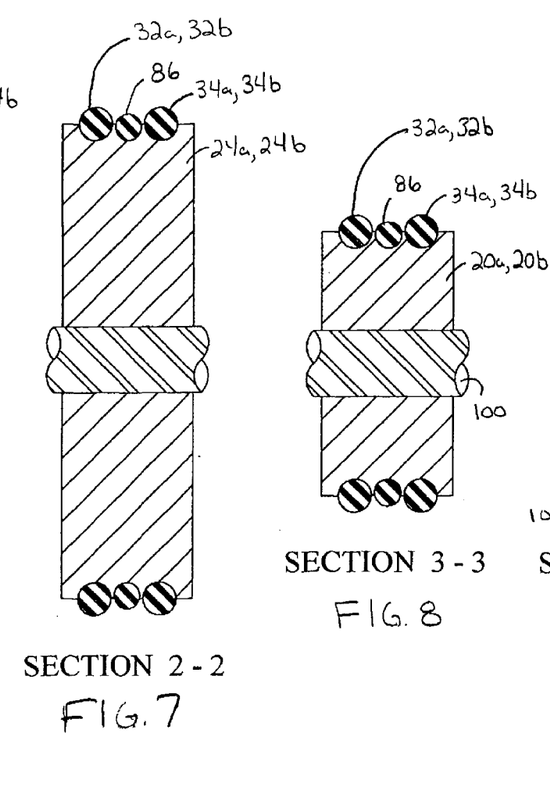
FIG. 7 is a cross-sectional view along line 2—2 of FIG. 4B.
FIG. 8 is a cross-sectional view along line 3—3 of FIG. 4B.

In the illustrated embodiment the input pulley 20a, 20b has a smaller diameter than the output pulley 24a, 24b. Alternatively, both pulleys 22, 24 could be of the same diameter. As can be seen in FIGS. 7 and 8, the pulleys 20a, 20b; 24a, 24b include laterally spaced grooves that carry the belts 32a, 32b; 34a, 34b. The grooves help ensure correct spacing of the belts and help to retain the belts on the pulleys.

A support plate 80 is positioned under the upper drive run for vertically supporting the conveyor belts 32a, 32b; 34a, 34b. When profiled belts such as the round belts are used, the support plate 80 may include laterally spaced grooves in which the belts travel. (See FIG. 10). The grooves help to maintain correct lateral spacing of the belts and ensure that the belts properly align with the grooves in the input pulleys 20a, 20b and output pulleys 24a, 24b.

The transfer mechanism 16 includes a first transfer pulley 82, a second transfer pulley 84, and a transfer belt 86 connected for rotation around the transfer pulleys 82, 84. The first transfer pulley 82 is positioned longitudinally inwardly of the output pulley 24a on the first conveyer 1a. The first transfer pulley 82 is rotatably mounted, e.g., by a bearing assembly, on a shaft 88 that extends between the front and back rails 28a, 30a of the frame 26a. Alternatively, the pulley 82 could be fixedly mounted on the shaft 88, e.g., by a keying connection, and the shaft 88 could be rotatably mounted on the frame 26a, e.g., by bearing assemblies.

The second transfer pulley 84 is positioned longitudinally inwardly of the input pulley 20b on the second conveyor 12b. The second transfer pulley 82 is fixedly mounted on a shaft 90 that is rotatably mounted on the frame 26b. The transfer belt 86 extends around the transfer pulleys 82, 84 and defines an upper transfer run 92 that extends longitudinally between the output end 22a of the first conveyor 12a and the input end 18b of the second conveyor 12b. The transfer belt 86 is positioned on the transfer pulleys 82, 84 such that it is laterally interposed between the belts 32a, 34a; 32b, 34b of the each of the conveyors 12a, 12b.

A means may be provided for operating the transfer belt 86 at the same speed as one of the conveyors 12a, 12b. Alternatively, a separate motor could be provided for operating the transfer belt 86. Preferably the means operates the transfer belt 86 at the same speed as the second, i.e., downstream, conveyor 12b. In operation the second conveyor 12b, and hence the transfer belt 86, normally operate at a faster speed than the first conveyor 12a. As a result, the pins 17 accelerate as they are transferred off of the upstream conveyor. This is beneficial because it maintains separation between adjacent pins 17, which prevents the pins from being damaged due to impacting one another and also allows the pins to be inspected, e.g., by eddy current and/or cameras.

In the illustrated embodiment, the means includes a gear assembly 94 that interconnects the input pulley 20b of the second conveyor 12b with the second transfer pulley 84. (See FIG. 4A). The gear assembly 94 includes a first gear 96 that is connected for rotation with the input pulley 20b and a second gear 98 that is connected for rotation with the second transfer pulley 84. Specifically, the first gear 96 and input pulley 20b are both fixedly mounted, e.g., by a keying mechanism, on a shaft 100. The shaft 100 in turn is rotatably mounted, e.g., by bearing assemblies, on the conveyor frame 26b. Similarly, the second gear 98 and the second transfer pulley 84 are fixedly mounted on the shaft 90, which as was discussed above, is also rotatably mounted on the frame 26b of the second conveyor 12b. A third gear 102 is interposed between the first and second gears 96, 98. The third gear 102 is rotatably mounted, e.g., by a bearing assembly, around a shaft 104. The shaft 104 is fixedly mounted on the frame 26b of the second conveyor 12b.

Figure 4A:
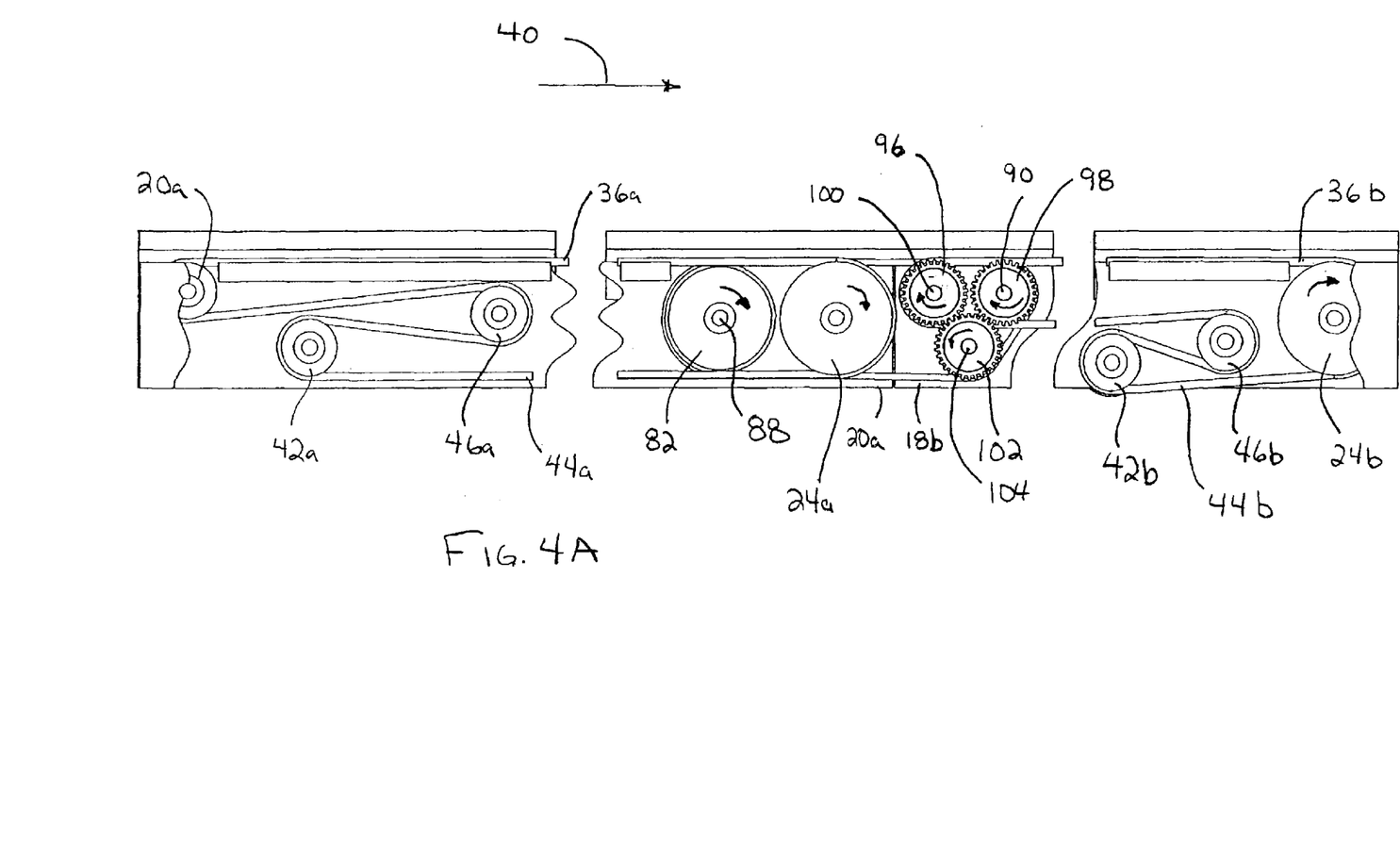
FIG. 4A is a front view of the conveyor system of FIG. 1.
Figure 4B:
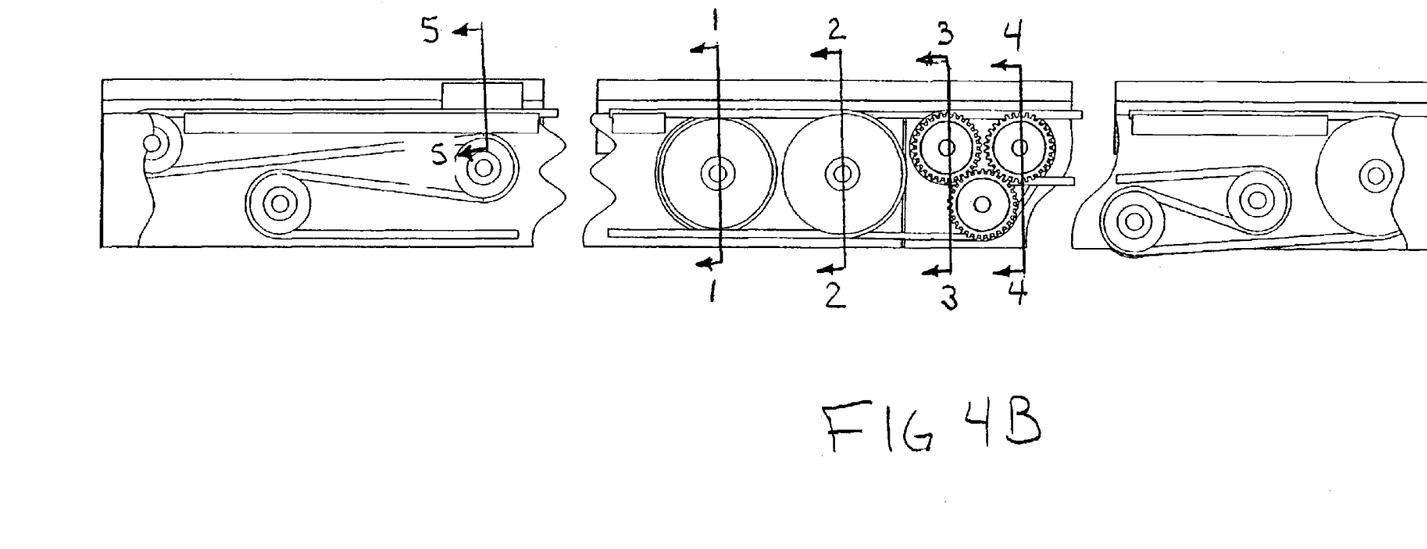
FIG. 4B is a front view like FIG. 3A, but with cross-section lines.

When the second conveyor 12b operates, its belts 32b, 34b travel in the direction 40. As the belts 32a, 34b rotate, they impart a clockwise rotation on the input pulley 20b, and hence, the first gear 96. Clockwise rotation of the first gear 96 causes the third gear 102 to rotate in the counterclockwise direction. The counterclockwise rotation of the third gear 102 imparts clockwise rotation of the second gear 98, and hence the second transfer pulley 84. Clockwise rotation of the second transfer pulley 84 in turn imparts movement of the transfer belt 86 in the same direction 40 and at the same speed as the belts 32b, 34b of the second conveyor 12b. While gears have been used to operate the transfer belt 86 in the illustrated embodiment, it will be appreciated that other means could be employed for this purpose. For example, the gears could be replaced by belts and pulleys. Alternatively, a separate motor could be used to drive the transfer belt at a speed independent of that of either of the conveyors. In addition, the gearing mechanism could be constructed to cause the transfer belt 86 to run at a different speed than the second conveyor 12b. Further, as will be appreciated, the direction motors can be reversed to convey goods in the direction opposite the arrow 40.

Figure 6:
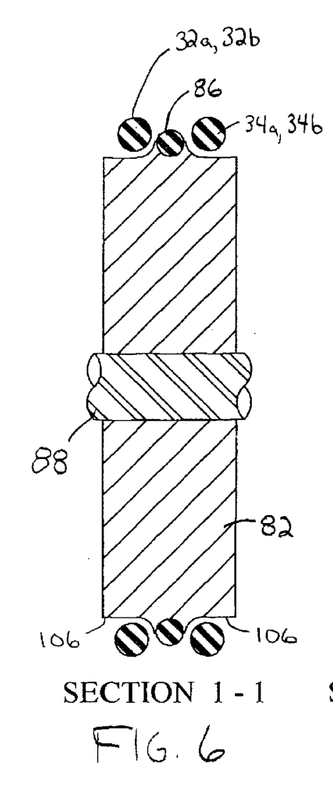
FIG. 6 is a cross-sectional view along line 1—1 of FIG. 4B.

As can be seen in FIGS. 6 and 9, the transfer pulleys 82, 84 have reduced outer diameter outer portions 106, 108. The outer portions 106, 108 provide a clearance for the conveyor belts 32a, 34a, 32b, 34b so that the transfer mechanism does not adversely effect the operation of the conveyors 12a, 12b.

As can be seen in FIG. 7, the output pulley 24a includes outer grooves that carry the conveyor belts 32a, 34a. When the conveyor belts 34a, 34b are properly tensioned, the belts 32a, 34a and the pulley 24a will frictionally engage each other and hence turn at the same speed. The output pulley 24a also includes a center groove that carries the transfer belt 86. Preferably, the system may be designed so that the transfer belt 86 freely slides through the groove in the pulley 24a, such that it does not impact the speed of the first conveyor 12a or vise versa. For example, the center groove can be sized to provide a clearance fit with the transfer belt 86. In addition, as is shown, the transfer belt 86 may have a smaller diameter than that of the conveyor belts. As a result, when components move across the output pulley 24a they are primarily supported by the conveyor belts 32a, 34a.

The input pulley 20a also includes a center groove for receiving the transfer belt 86 and outer grooves for carrying the conveyor belts 32b, 34b of the second conveyor 12b. (See FIG. 8).

Figure 5:
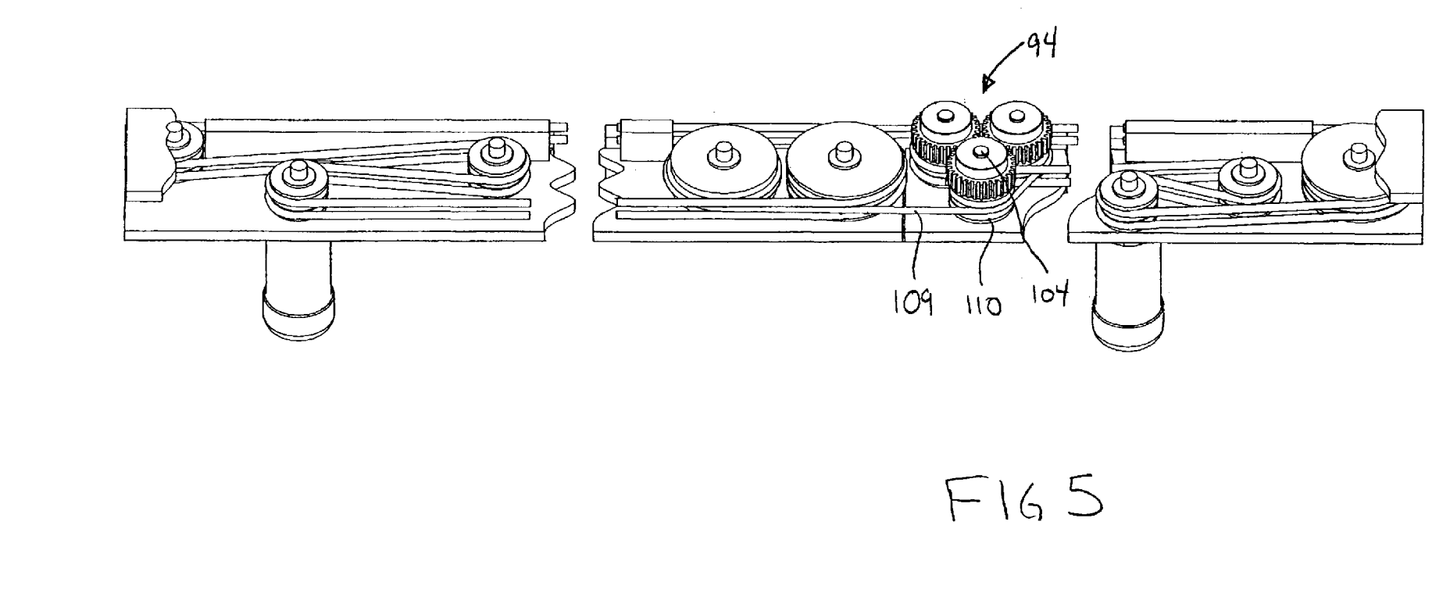
FIG. 5 is a bottom front perspective view of the conveyor system of FIG. 1.

The transfer mechanism also includes a third transfer pulley 110 interposed along the return run 109 of the transfer belt 86. (See FIG. 5). The third pulley 110 is configured to route the return run around the input pulley 20b of the second conveyor 12b and the output pulley 24a of the first conveyor 12a. In the illustrated embodiment, the third pulley 10 is rotatably mounted on the shaft 104. The third transfer pulley 110 is sized and positioned such that the return run of the transfer belt 86 is routed below the output pulley 24a of the first conveyor 12a and the input pulley 20b of the second conveyor 12b.

Figure 12:
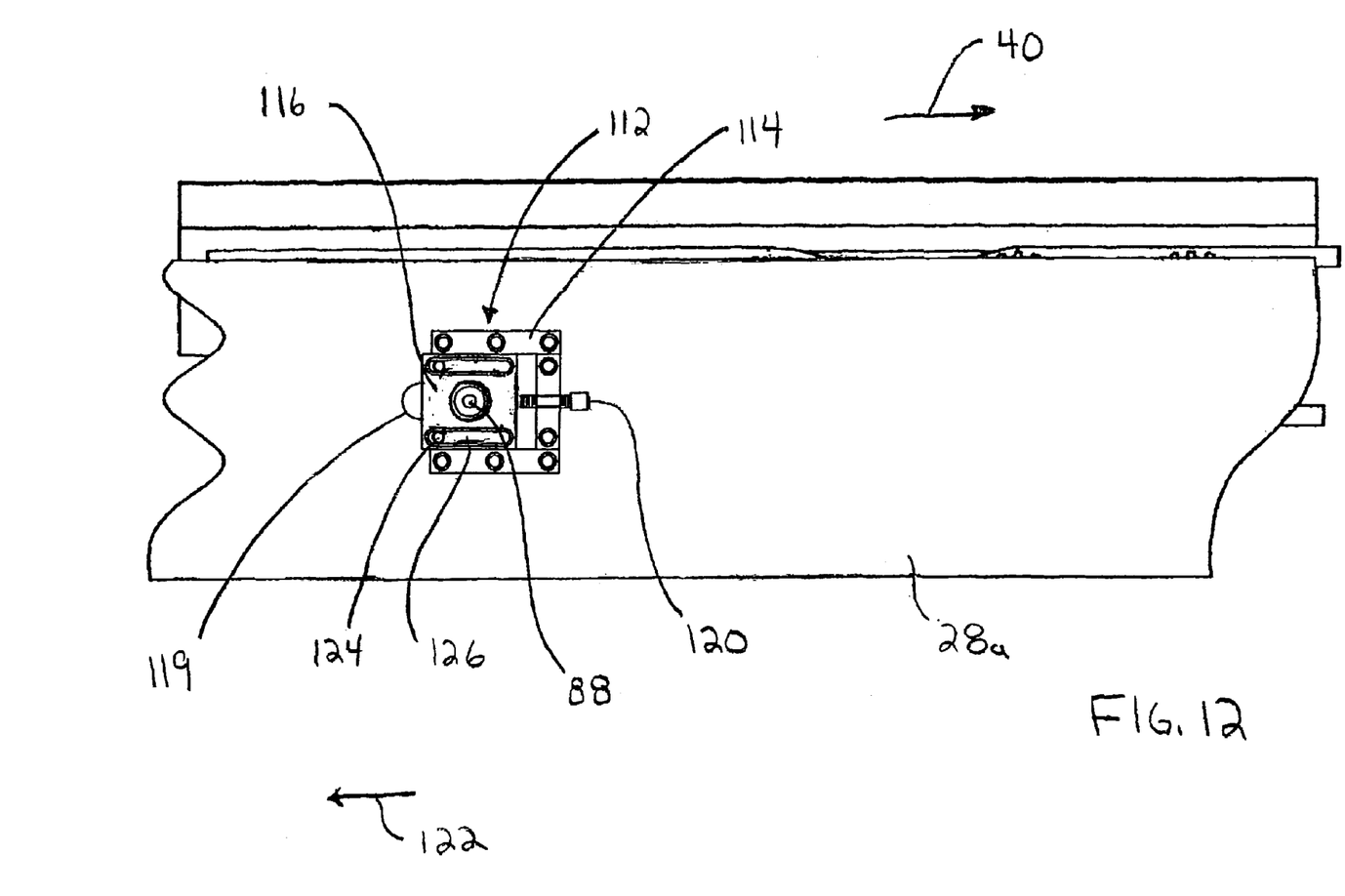
FIG. 12 illustrates a tensioning mechanism for adjusting the tension of the transfer belt.

Referring to FIG. 12, a tensioning means is provided for adjusting the tension of the transfer belt 86. The tensioning means includes two identical tension adjusters 112, which are mounted on opposite sides of the first transfer pulley 82. Each tension adjuster 112 includes a first member 114, which is rigidly secured to one of the frame rails 28a, 30a at a location overlying the first transfer pulley 82. A second member 116 is slidably connected to the first member for longitudinal movement relative to the first member 114. The ends of the shaft 88 that carry the first transfer pulley 82 are rotatably mounted, e.g, by bearing assemblies, in the second members 116. The front and back rails 28a, 30a of the frame 26a each include a longitudinal slot 118 to permit the shaft 88 to be moved longitudinally relative to the frame. An adjuster screw 120 extends through one end of the first member 114 and engages against the inner end of the second end member 116.

To increase the tension on the transfer belt 86, both adjuster screws 120 are threaded inwardly in the first members 114. As the screws 120 are threaded inwardly, they push the second members 116 in the direction of the arrow 122. As the second members 116 move in the direction 122, they move the first transfer pulley 82 in the same direction, thereby increasing the tension on the transfer belt 86. As will be appreciated, tension on the belt 86 can be decreased by threading the screws 120 outwardly in the first members 114. Lockdown fasteners 124 extend through longitudinal slots 126 in the second member 116 and thread into the rails 28a, 30a of the frame 26a. The lockdown fasteners 124 can be tightened to fix the position of the second member 116 relative to the first member 114, and can be loosened to allow the second member 116 to slide within the first member 114, as was explained above. The tensioning mechanism could take numerous other forms without departing from the scope of the present invention. For example, the tension mechanism could include clamps carried by the ends of the shaft 88. The clamps would be configured to releasable fix the position of the shaft in the frame 26a. The clamps could include threaded members extending from the end of the shaft 88. Handles would thread onto the threaded members and be configured to engage against the side members of the frame to fix the position of the shaft 88 in the longitudinal slots in the frame 26a. The handles could be loosened, e.g., thread outwardly on the threaded members, to allow the shaft to be moved longitudinally in the slots.

The pulleys 20, 24, 82, 84 110, second (inner) members 70 of the support rails 50, and the support plate 80 may all be formed from a polymeric material. One suitable polymeric material is Delrin® as is available from by E.I. du Pont de Nemours and Company. Delrin® works particularly well because it provides a good combination of strength, stiffness, hardness, dimensional stability, toughness, fatigue resistance, solvent and fuel resistance, abrasion resistance, low wear and low friction.

While the invention has been described with reference to a preferred embodiment, it will be understood by those skilled in the art that various changes may be made and equivalents may be substituted without departing from the scope of the invention. For example, while two conveyors have been shown, it will be appreciated that additional conveyors and transfer mechanisms can be used depending on the specific. Moreover, while the conveyors have been shown in a generally horizontal orientation, it will be appreciated that the either of the conveyors could be angled. Many other modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A conveyor system, comprising
   a. a first conveyor having an input end, an output end, and a pair of laterally spaced belts rotating between the input and output ends, the belts defining an upper drive run which travels in a direction from the input end towards the output end;
   b. a second conveyor having an input end adjacent the output end of the first conveyor and an output end distally spaced from the input end, the second conveyor having a pair of laterally spaced belts rotating between its input and output ends, the belts defining an upper drive run which travels in a direction from the input end towards the output end;
   c. a transfer mechanism extending between the output end of the first conveyor and the input end of the second conveyor, the transfer mechanism comprising:
      i. a first transfer pulley positioned inward of the output end of the first conveyor;
      ii. a second transfer pulley positioned inwardly of the output end of the second conveyor; and
      iii. a transfer belt rotating between the first and second transfer pulleys, the transfer belt defining an upper transfer run that extends longitudinally between the output end of the first conveyor and the input end of the second conveyor,
   d. means for rotating the transfer belt at the same speed as the belts of one of the first and second conveyors, wherein the means comprises a gear assembly interconnecting one of the transfer pulleys with one of the pulleys of the first and second conveyor.

2. The conveyor system of the claim 1, wherein the means comprises a gear assembly interconnecting the second transfer pulley with the input pulley of the second conveyor.

3. The conveyor system of claim 1, wherein the transfer pulleys have reduced outer diameter that provide clearance for the belts from the conveyor.

4. The conveyor system of claim 1, further comprising vertical support rails extending longitudinally along the upper transfer run.

5. The conveyor system claim 1, further comprising a tensioning mechanism for adjusting the tension of the transfer belt.

6. The conveyor system of claim 5, wherein the tensioning mechanism is adapted to move one of the first and second transfer pulleys in the longitudinal direction.

7. A conveyor system as set forth in claim 1, wherein the transfer belt is round in cross-section.

8. A conveyor system, comprising:
   a. a first conveyor having an input end carrying an input pulley, an output end carrying an output pulley, a pair of laterally spaced belts connected to rotate between the input and output pulleys, the belts defining an upper drive run which travels in a direction from the input end towards the output end;
   b. a second conveyor having an input end adjacent the output end of the first conveyor and a distally spaced output end, the second conveyor having an input pulley carried by its input end, an output pulley carried by its output end, and a pair of laterally spaced drive belts connected for rotation between the input and output pulleys, the belts defining an upper drive run which travels in a direction from the input end towards the output end; and
   c. a transfer mechanism extending between the output end of the first conveyor and the input end of the second conveyor, the transfer mechanism comprising:
      i. a first transfer pulley positioned longitudinally inwardly of the output pulley on the first conveyer
      ii. a second transfer pulley positioned longitudinally inwardly of the input pulley on the second conveyor; and
      iii. a transfer belt rotating between the first and second transfer pulleys, the transfer belt defining an upper transfer run and a lower return run, the upper transfer run extending longitudinally between the output end of the first conveyor and the input end of the second conveyor and being laterally interposed between the belts of the first and second conveyors,
   d. means for rotating the transfer belt at the same speed as the belts of one of the first and second conveyor sections, wherein the means comprises a gear assembly interconnecting one of the transfer pulleys with one of the pulleys of the first and second conveyor.

9. The conveyor system of claim 8, wherein the transfer pulleys have reduced outer diameter sections that provide clearance for the belts from the conveyor.

10. The conveyor system of claim 8, further comprising vertical support rails extending longitudinally along the upper transfer runs.

11. The conveyor system claim 8, further comprising a tensioning mechanism for adjusting the tension of the transfer belt.

12. A conveyor system as set forth in claim 8, wherein the transfer mechanism further comprises a third transfer pulley interposed along the return run of the transfer belt, the third transfer pulley being adapted to route the return run around the input pulley of the second conveyor and the output pulley of the first conveyor.

13. A conveyor system, comprising:
- a first conveyor having an input end carrying an input pulley, an output end carrying an output pulley, a pair of laterally spaced belts connected to rotate between the input and output pulleys, the belts defining an upper drive run;
- a first motor connected to drive the belts of the first conveyor so that their upper drive run travels in a direction from the input end towards the output end;
- a second conveyor having an input end adjacent the output end of the first conveyor and a distally spaced output end, the second conveyor having an input pulley carried by its input end, an output pulley carried by its output end, and a pair of laterally spaced drive belts connected for rotation between the input and output pulleys, the belts defining an upper drive run;
- a second motor connected to drive the belts of the second conveyor such that their upper drive run travels in a direction from the input end towards the output end;
- a first transfer pulley positioned longitudinally inwardly of the output pulley on the first conveyer;
- a second transfer pulley positioned longitudinally inwardly of the input pulley on the second conveyor; and
- a transfer belt rotating between the first and second transfer pulleys, the transfer belt defining an upper transfer run and a lower return run, the upper transfer run extending extends longitudinally between the output end of the first conveyor and the input end of the second conveyor; and
- a gear assembly interconnecting one of the transfer pulleys with one of first and second conveyor such that the transfer belt rotates at the same speed as the interconnected conveyor.

14. A conveyor system as set forth in claim 13, wherein the conveyor belts and the transfer belt are round in cross section.

15. A conveyor system as set forth in claim 13, further comprising a third transfer pulley interposed along the return run of the transfer belt, the third transfer pulley being adapted to route the return run around the input pulley of the second conveyor and the output pulley of the first conveyor.

16. A convey or system as set forth in claim 13, wherein the transfer belt is laterally interposed between the conveyor belts of the first and second conveyors.

17. A conveyor system, comprising
a. a first conveyor having an input end, an output end, and a pair of laterally spaced belts rotating between the input and output ends, the belts defining an upper drive run which travels in a direction from the input end towards the output end;
b. a second conveyor having an input end adjacent the output end of the first conveyor and an output end distally spaced from the input end, the second conveyor having a pair of laterally spaced belts rotating between its input and output ends, the belts defining an upper drive run which travels in a direction from the input end towards the output end;
c. a transfer mechanism extending between the output end of the first conveyor and the input end of the second conveyor, the transfer mechanism comprising:
   i. a first transfer pulley positioned inward of the output end of the first conveyor;
   ii. a second transfer pulley positioned inwardly of the output end of the second conveyor; and
   iii. a transfer belt rotating between the first and second transfer pulleys, the transfer belt defining an upper transfer run that extends longitudinally between the output end of the first conveyor and the input end of the second conveyor, wherein the conveyor belts are round in cross section.

18. A conveyor system, comprising:
a. a first conveyor having an input end carrying an input pulley, an output end carrying an output pulley, a pair of laterally spaced belts connected to rotate between the input and output pulleys, the belts defining an upper drive run which travels in a direction from the input end towards the output end;
b. a second conveyor having an input end adjacent the output end of the first conveyor and a distally spaced output end, the second conveyor having an input pulley carried by its input end, an output pulley carried by its output end, and a pair of laterally spaced drive belts connected for rotation between the input and output pulleys, the belts defining an upper drive run which travels in a direction from the input end towards the output end; and
c. a transfer mechanism extending between the output end of the first conveyor and the input end of the second conveyor, the transfer mechanism comprising:
   i. a first transfer pulley positioned longitudinally inwardly of the output pulley on the first conveyer
   ii. a second transfer pulley positioned longitudinally inwardly of the input pulley on the second conveyor; and
   iii. a transfer belt rotating between the first and second transfer pulleys, the transfer belt defining an upper transfer run and a lower return run, the upper transfer run extending longitudinally between the output end of the first conveyor and the input end of the second conveyor and being laterally interposed between the belts of the first and second conveyors, wherein the conveyor belts and the transfer belt are round in cross section.

\* \* \* \* \*